(12) United States Patent
An et al.

(10) Patent No.: US 10,375,393 B2
(45) Date of Patent: Aug. 6, 2019

(54) METHOD OF VIDEO CODING USING BINARY TREE BLOCK PARTITIONING

(71) Applicant: MediaTek Singapore Pte. Ltd., Singapore (SG)

(72) Inventors: Jicheng An, Beijing (CN); Yi-Wen Chen, Taichung (TW); Kai Zhang, Beijing (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 15/801,457

(22) Filed: Nov. 2, 2017

(65) Prior Publication Data

US 2018/0063528 A1   Mar. 1, 2018

Related U.S. Application Data

(63) Continuation of application No. 15/532,166, filed as application No. PCT/CN2015/096761 on Dec. 9, 2015, now Pat. No. 9,843,804.

(51) Int. Cl.
*H03M 7/00* (2006.01)
*H04N 19/119* (2014.01)
(Continued)

(52) U.S. Cl.
CPC ......... *H04N 19/119* (2014.11); *H04N 19/147* (2014.11); *H04N 19/174* (2014.11);
(Continued)

(58) Field of Classification Search
CPC .......... G02B 27/146; G06T 9/00; G06T 9/20; H04N 19/159; H04N 19/122; H04N 19/105; H04N 19/96; H04N 19/119; H04N 19/11
(Continued)

(56) References Cited

U.S. PATENT DOCUMENTS 6,584,226 B1   6/2003   Chaddha et al.
8,750,634 B2   6/2014   Cohen et al.
(Continued)

FOREIGN PATENT DOCUMENTS

CN   101459847 A   6/2009
CN   101990104 A   3/2011
(Continued)

OTHER PUBLICATIONS

Chan, M.H., et al.; "Variable Size Block Matching Motion Compensation With Applications to video coding;" IEE Proceedings; vol. 137; Pt. 1; No. 4; Aug. 1990; pp. 205-212.
(Continued)

*Primary Examiner* — Joseph J Lauture
(74) *Attorney, Agent, or Firm* — McClure, Qualey & Rodack, LLP

(57) ABSTRACT

A method of video coding using block partitioning process including a binary tree partitioning process is disclosed. The block partitioning process is applied to a block of video data to partition the block into final sub-blocks. Coding process comprising prediction process, transform process or both for the block will be applied at the final sub-blocks level. The binary tree partitioning process can be applied to a given block when an associated indicator has a first value. In another embodiment, the quadtree partitioning process is applied to a block first. The quadtree leaf nodes are further partitioned using one or more stages of binary tree partitioning process. The quadtree partitioning process can be applied to a given block recursively to generate quadtree leaf nodes until a termination condition is met.

28 Claims, 5 Drawing Sheets

(51) Int. Cl.

| | |
|---|---|
| *H04N 19/176* | (2014.01) |
| *H04N 19/96* | (2014.01) |
| *H04N 19/174* | (2014.01) |
| *H04N 19/147* | (2014.01) |
| *G06T 9/00* | (2006.01) |
| *G06T 9/20* | (2006.01) |
| *G02B 27/14* | (2006.01) |
| *H04N 13/189* | (2018.01) |

(52) U.S. Cl.
CPC ............ *H04N 19/176* (2014.11); *H04N 19/96* (2014.11); *G02B 27/146* (2013.01); *G06T 9/00* (2013.01); *G06T 9/005* (2013.01); *G06T 9/20* (2013.01); *H04N 13/189* (2018.05)

(58) Field of Classification Search
USPC .................................... 341/79; 382/233, 232
See application file for complete search history.

(56) References Cited

U.S. PATENT DOCUMENTS

| | | | |
|---|---|---|---|
| 2011/0249743 A1 | 10/2011 | Zhao et al. | |
| 2011/0310976 A1 | 12/2011 | Wang et al. | |
| 2012/0128070 A1 | 5/2012 | Kim et al. | |
| 2014/0029670 A1 | 1/2014 | Kung et al. | |
| 2015/0146782 A1 | 5/2015 | Lei et al. | |
| 2015/0201212 A1 | 7/2015 | Zhang | |
| 2018/0098097 A1* | 4/2018 | Huang ................. | H04N 19/96 |

FOREIGN PATENT DOCUMENTS

| | | |
|---|---|---|
| CN | 102118615 A | 7/2011 |
| CN | 102801976 A | 11/2012 |
| CN | 103024373 A | 4/2013 |
| CN | 103299634 A | 9/2013 |
| CN | 103503461 A | 1/2014 |
| GB | 2 505 408 A | 3/2014 |
| WO | 2011/160010 A1 | 12/2011 |
| WO | 2012/065552 A1 | 5/2012 |
| WO | 2013/023005 A1 | 2/2013 |
| WO | 2014/078068 A1 | 5/2014 |

OTHER PUBLICATIONS

International Search Report dated Jan. 27, 2016, issued in application No. PCT/CN2015/096761.

Luo, Y., et al.; "Fast binary partition tree based variable-size block-matching for video coding;" IEEE; Nov. 2009; pp. 609-612.

Kim, I.K., et al.; "Block partitioning structure in the HEVC standard;" IEEE Transactions on Circuits and Systems for Video Technology; vol. 22; No. 12; Dec. 2012; pp. 1697-1706.

Mediatek Inc.; "Block partitioning structure for next generation video coding;" Telecommunication Standardization Sector; Sep. 2015; pp. 1-7.

\* cited by examiner

METHOD OF VIDEO CODING USING BINARY TREE BLOCK PARTITIONING

CROSS REFERENCE TO RELATED APPLICATIONS

The present application is a continuation application of U.S. patent application Ser. No. 15/532,166, filed Jun 1, 2017, now U.S. Patent No. 9,843,804, which is a nation stage of PCT/CN2015/096761, filed Dec. 9, 2015 and claimed priority to PCT Patent Application, Serial No. PCT/CN2014/093445, filed on Dec. 10, 2014. The entireties of these priority applications are hereby incorporated by reference in its entirety.

TECHNICAL FIELD

The present invention relates to video coding. In particular, the present invention relates to coding techniques associated with coding tree design including a binary tree partitioning process for partitioning an image area for different processing such as a coding tree unit (CTU), coding unit (CU), prediction unit (PU) and transform unit (TU).

BACKGROUND

HEVC is an advanced video coding system developed under the Joint Collaborative Team on Video Coding (JCT-VC) group of video coding experts from ITU-T Study Group (*High Efficiency Video Coding*, Recommendation ITU-T H.265, Series H: Audiovisual And Multimedia Systems, Infrastructure of Audiovisual Services—Coding of Moving Video, International Telecommunication Unit, April, 2013). In HEVC, one slice is partitioned into multiple coding tree units (CTU). For color video data, each CTU consists of multiple coding tree blocks corresponding to the color components. In main profile, the minimum and the maximum sizes of CTU are specified by the syntax elements in the sequence parameter set (SPS) among the sizes of 8×8, 16×16, 32×32, and 64×64. For each slice, a raster scan traversing through the slice is used for processing the CTU.

The CTU is further partitioned into multiple coding units (CU) to adapt to various local characteristics. A quadtree denoted as the coding tree is used to partition the CTU into multiple CUs. Let CTU size be M×M where M is one of the values of 64, 32, or 16. The CTU can be a single CU or can be split into four smaller units of equal sizes of M/2×M/2, which are nodes of coding tree. If units are leaf nodes of coding tree, the units become CUs. Otherwise, the quadtree splitting process can be iterated until the size for a node reaches an allowed minimum CU size specified in the SPS (sequence parameter set).

FIG. 1A illustrates an example of partitioning result for a CU using the quadtree partition process recursively. Every time when a block is partitioned by a quadtree, the original block is split into four sub-blocks. In the next level, the sub-block becomes a new block to be further partitioned. The partitioning process may decide not to split a block. In this case, the block is not further partitioned. The partitioning process may be terminated when a minimum quadtree block size is reached. In some cases, the partitioning process may be terminated when the partition depth reaches a maximum value. The final sub-blocks in solid lines having various block sizes as shown in FIG. 1A correspond to the boundaries of coding units generated from the partitioning process. This partition process results in a recursive structure representing the partition decisions as shown in FIG. 1B and the tree-like structure in solid lines is called a coding tree, where each leaf node corresponds to a CU (i.e., one final sub-block). The decision whether to code a picture area using inter-picture (temporal) or intra-picture (spatial) prediction is made at the CU level. In HEVC, the minimum CU size can be 8×8. Therefore, the minimum granularity for switching different prediction type is 8×8.

For prediction process (e.g. inter prediction or intra prediction), each CU is further partitioned into one or more prediction units (PUs). Coupled with the CU, the PU works as a basic representative block for sharing the prediction information. Inside one PU, the same prediction process is applied and the relevant information is transmitted to the decoder on a PU basis. A CU can be split into one, two or four PUs according to the PU splitting type. HEVC defines eight shapes for splitting a CU into one or more PUs as shown in FIG. 2. Unlike the CU, the PU may be split only once. In FIG. 2, the lower four partitions correspond to asymmetric partition.

After obtaining the residual block for a CU by applying the prediction process to the one or more PUs generated by the splitting process, a CU can be partitioned into transform units (TUs) according to another quadtree structure similar to the coding tree for the CU. In FIG. 1A, the dotted lines indicate the resulting TU boundaries by quadtree partition of each CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

The same tree partitioning is generally applied to both luma and chroma components, although exceptions may apply when certain minimum sizes are reached for chroma.

The current HEVC block partitioning only uses the quadtree based partitioning to partition a CTU to CU and to partition a CU to TU in a recursive fashion until a limit is reached. On the other hand, the current HEVC allowed up to 8 partition types for the PU. However, the PU partition is only performed once for each PU. Therefore, it is desirable to further improve the coding efficiency to meet the needs of ever increasing storage and transmission of video contents.

SUMMARY

A method of video coding using block partitioning process including a binary tree partitioning process is disclosed. The block partitioning process is applied to a block of video data to partition the block into final sub-blocks. Coding process including prediction process, transform process or both for the block will be applied at the final sub-block level. The binary tree partitioning process can be applied to a given block recursively to generate binary tree leaf nodes. The partitioning of one node is implicitly terminated when the node reaches a minimum allowed binary tree leaf node size or binary tree depth associated with the node reaches a maximum allowed binary tree depth. Various binary partition types for the binary tree partitioning process can be used. For example, the types may consist of symmetric horizontal and vertical partitions. The types may also consist of symmetric horizontal and vertical partitions and asymmetric partitions.

A first indicator can be signaled for a given block to indicate whether the binary partition is applied to the given block. If the binary partition is applied to the given block, a second indicator may be signaled to indicate the binary partition type. In the case that the types consist of symmetric horizontal and vertical partitions, a 1-bit flag can be used to indicate the symmetric horizontal partition or the symmetric vertical partition. The second indicator can be inferred as the symmetric vertical partition when height of the given block reaches the minimum allowed height. Similarly, the second indicator can be inferred to be the symmetric horizontal partition when width of the given block reaches the minimum allowed width. The minimum allowed height and the minimum allowed width can be specified in high level syntax such as SPS (sequence parameter set), PPS (picture parameter set) or slice header.

The block partitioning process based on recursive binary tree partitioning process disclosed above can be used to partition a CTU (coding tree unit) into CUs (coding units). In one embodiment, all generated CUs are used for prediction process, transform process or both respectively without any further explicit partitioning process. The block partitioning process based on recursive binary tree partitioning process disclosed above can also be used to partition a picture into CTUs, a slice into CTUs, a CU into PUs, a CU into TUs, or a PU into TUs.

The block of video data for luma and non-luma components in an I-slice may use individual binary tree partitioning process or the block of video data for two chroma components in an I-slice uses individual binary tree partitioning process. The block of video data for each color component in an I-slice may also use its individual binary tree partitioning process.

When the block partitioning process includes recursive binary tree partition process, the block partitioning process may further comprises a quadtree partitioning process, where when the quadtree partitioning process decides to apply quadtree partition to a second given block, the second given block is always split into four sub-blocks. The quadtree partitioning process can be first applied to the block of video data recursively before the binary tree partitioning process to generate quadtree leaf nodes. According to one embodiment, the binary tree partitioning process is applied to the quadtree leaf nodes recursively to generate the final sub-blocks. The quadtree partitioning of one node can be implicitly terminated when the node reaches a minimum allowed quadtree leaf node size or the quadtree depth associated with the node reaches a maximum allowed quadtree depth. For any quadtree leaf node with a block size not larger than a maximum allowed binary tree root node size, the binary tree partitioning process can be further applied to the quadtree leaf node recursively. The binary tree partitioning of one node can be implicitly terminated when the node reaches a minimum allowed binary tree leaf node size or the binary tree depth associated with node reaches a maximum allowed binary tree depth.

The minimum allowed quadtree leaf node size, the maximum allowed quadtree depth, the maximum allowed binary tree root node size, the minimum allowed binary tree leaf node size, and the maximum allowed binary tree depth can be specified in high level syntax such as SPS (sequence parameter set), PPS (picture parameter set) or slice header.

The quadtree partitioning process plus the binary tree partitioning process as disclosed above can be applied to partition a CTU into CUs. In one embodiment, all generated CUs are used for prediction process, transform process or both respectively without any further explicit partitioning process. Also the above partitioning process can be used to partition a picture into CTUs, a slice into CTUs, a CU into PUs, a CU into TUs, or a PU into TUs. The block of video data for luma and non-luma components in an I-slice may use individual quadtree plus binary tree partitioning process or the block of video data for two chroma components in an I-slice uses individual quadtree plus binary tree partitioning process.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
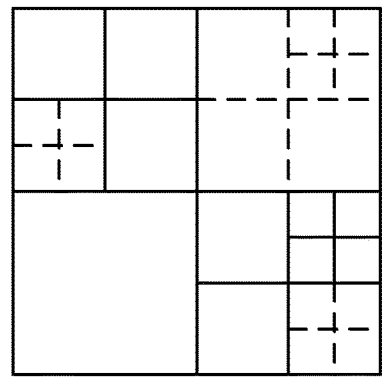
FIG. 1A illustrates an example of quadtree partitioning process according to the HEVC (high efficiency video coding) standard to partition a CTU (coding tree unit) into CUs (coding units) as shown in solid lines and to partition a CU into TUs (transform units) as shown in dashed lines.
Figure 1B:
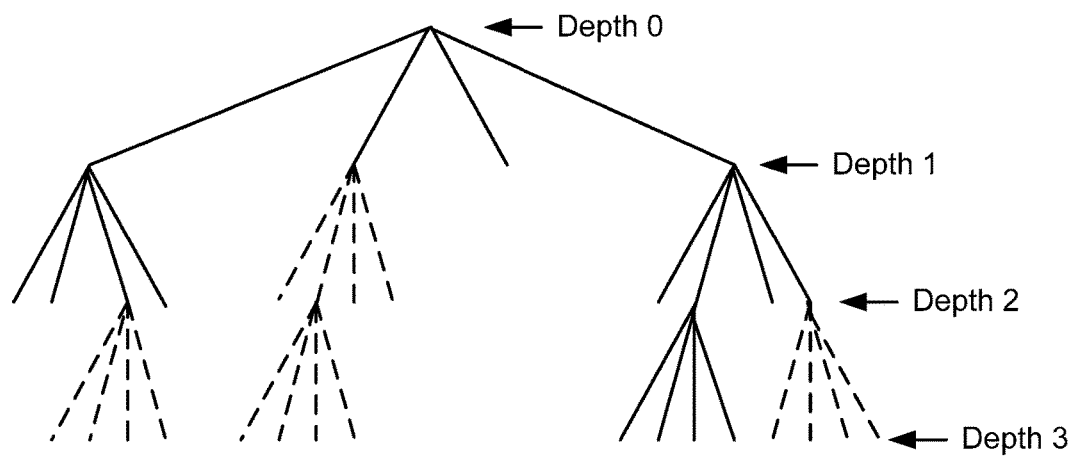
FIG. 1B illustrates an example of a partitioning tree correspond to the partitioning structure in FIG. 1A.
Figure 2:
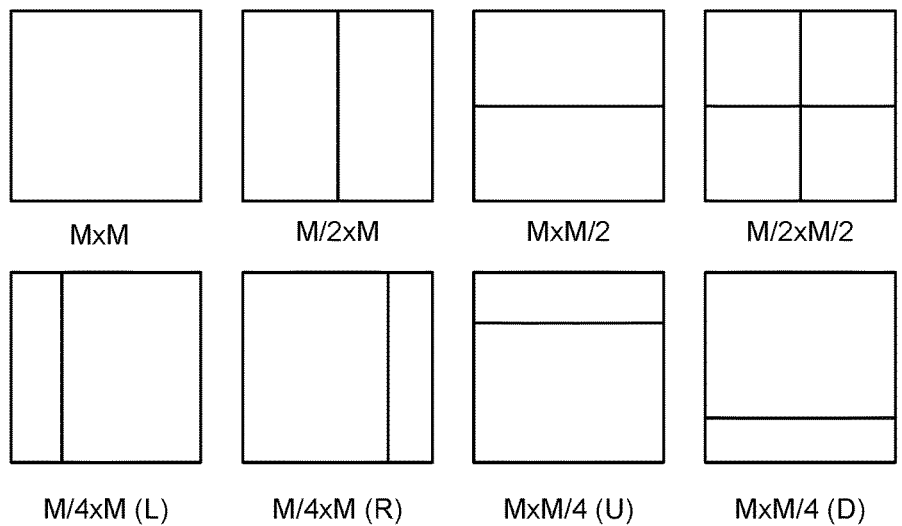
FIG. 2 illustrates the available partition types for partitioning a PU (prediction unit) according to the HEVC (high efficiency video coding) standard.
Figure 3:
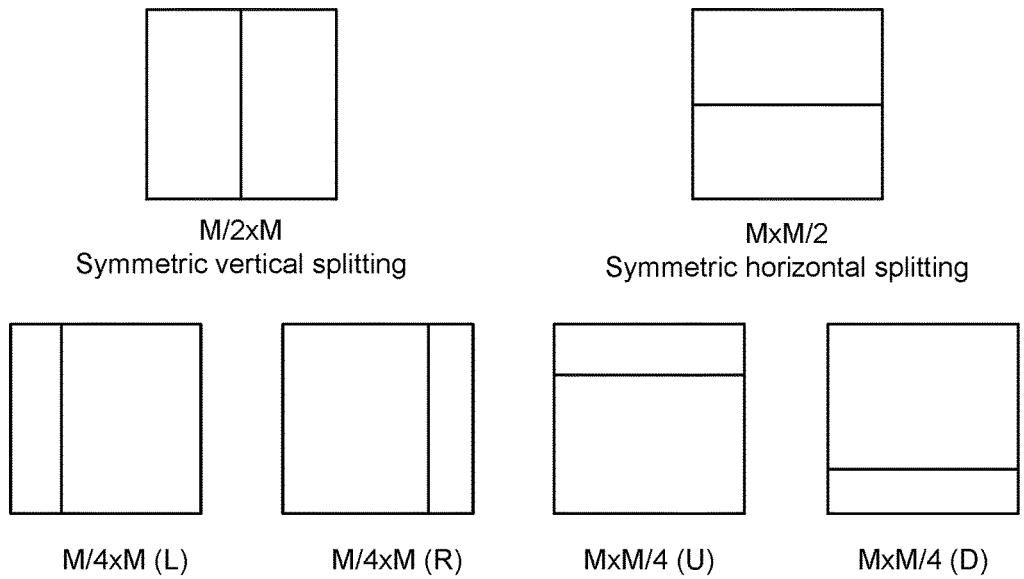
FIG. 3 illustrates an example of available partition types for the binary tree partitioning process according to an embodiment of the present invention.

In the present invention, a binary tree block partitioning process is disclosed. According to one embodiment of the present invention, the binary tree partitioning process can be applied to a block recursively. Every time when the binary tree partitioning process decides to partition a given block, the given block is always split into two smaller blocks, which are also referred as sub-blocks in this disclosure. Exemplary splitting types according to one embodiment are shown in FIG. 3, which includes two symmetric binary tree partitioning types and four asymmetric binary tree partitioning types. The symmetric horizontal and vertical splitting types are the simplest splitting types and often achieve the good coding efficiency. Therefore, in one embodiment, only these two symmetric binary tree partitioning types are used. For a given block of size M×N, a flag can be signaled to indicate whether the block is split into two smaller blocks. If yes, a second syntax element is signaled to indicate which splitting type is used. If the horizontal splitting is used then it is split into two blocks of size M×N/2. If the vertical splitting is used, the block is split into two blocks of size M/2×N. In the embodiment shown in FIG. 3, M is equal to N, but the present invention is not limited thereto.

According to the present invention, the binary tree splitting process can be iterated until the size (width or height) for a splitting block reaches a minimum allowed block size (width or height) or the binary tree partitioning process reaches a maximum allowed binary tree depth. The minimum allowed block size can be specified in high level syntax such as SPS (sequence parameter set), PPS (picture parameter set) or slice header. However, the present invention is not limited thereto. Since the binary tree has two splitting types (i.e., horizontal and vertical), the minimum allowed block width and height are both indicated. In some cases, the second syntax element to indicate which splitting type is used can be inferred and there is no need to signal the second syntax element. For example, if a block with a width equal to the minimum allowed block width is split, the splitting type must be horizontal partition. If vertical partition were applied, it would result in sub-blocks having block width smaller than the minimum allowed block width. Therefore, horizontal splitting is implicit when vertical splitting would result in a block width smaller than the indicated minimum. Similarly, vertical splitting is implicit when horizontal splitting would result in a block height smaller than the indicated minimum height.

Figure 4A:
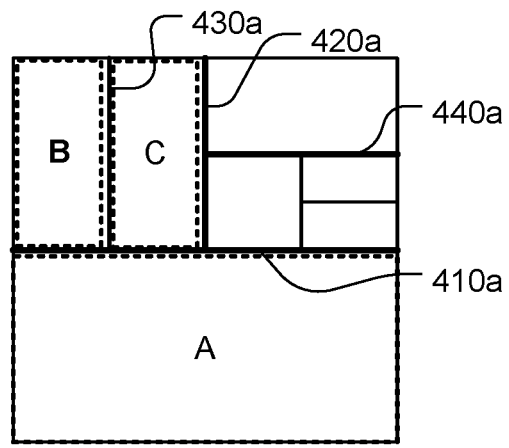
FIG. 4A illustrates an example of binary tree partitioning process according to an embodiment of the present invention to partition a block of video data into final sub-blocks for the coding process comprising prediction process, transform process or both.
Figure 4B:
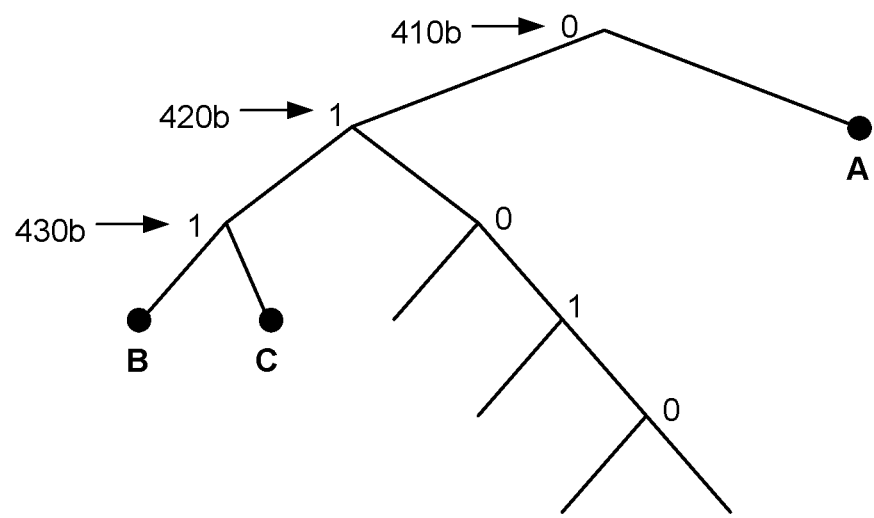
FIG. 4B illustrates an example of a partitioning tree correspond to the partitioning structure in FIG. 4A.

FIG. 4A illustrates an example of block partitioning process using binary tree to partition a block into final sub-blocks and FIG. 4B illustrates its corresponding partitioning tree (which is a binary tree in this embodiment). In this example, the partition types consist of two types corresponding to symmetric horizontal partition and vertical partition. In each splitting (i.e., non-leaf node of the binary tree), one flag indicating the splitting type (i.e., horizontal or vertical) is signaled, where 0 indicates horizontal splitting and 1 indicates vertical splitting. Each final sub-block corresponds to one binary tree leaf node. In other words, the number of final sub-blocks in FIG. 4A is the same as the number of leaf nodes of the binary tree.

The first few partition steps are shown in details. In the first step, the binary tree partitioning process decides to partition the initial block (i.e., the root node for the binary tree partition) using horizontal partition, which split the block into two sub-blocks corresponding to the upper half and the lower half. The first horizontal partition is indicated by a horizontal line (410a) in FIG. 4A. A "0" (410b) is assigned to the root node to indicate the corresponding partition process. The partition process decides not to further split the lower half (labelled as sub-block "A" in FIG. 4A) and the lower half is not subject to any further split. Therefore, the sub-block "A" is a final sub-block. In the next step, the upper half is partitioned by vertical partition (420a) to split the upper half into an upper-left sub-block and upper-right sub-block. A "1" (420b) is assigned to the corresponding binary tree node to indicate the vertical partition. In FIG. 4B, the convention has adopted to designate a left branch for a left sub-block in case of vertical partition or an upper sub-block in case of horizontal partition. As shown in FIG. 4A, another vertical partition (430a) is applied to the upper-left sub-block to generate sub-blocks "B" and "C". Since sub-blocks "B" and "C" are not subject to further split, sub-blocks "B" and "C" are final sub-blocks. A "1" (430b) is assigned to the corresponding binary tree node. The sub-blocks "B" and "C" correspond to two binary tree leaf nodes as indicated in FIG. 4B. FIGS. 4A and 4B are intended to illustrate one example of binary tree partitioning process according to an embodiment of the present invention. The present invention is not limited to the example in FIG. 4A and FIG. 4B.

The binary tree structure disclosed above can be used for partitioning a block into multiple smaller blocks (i.e., sub-blocks) such as partitioning a picture into CTUs, a slice into CTUs, a CTU into CUs, a CU into PUs, a CU into TUs, or a PU into TUs, and so on. In one embodiment, the binary tree is used for partitioning a CTU into CUs, i.e., the root node of the binary tree being a CTU and the leaf nodes of the binary tree are CUs. The leaf nodes are further processed by prediction and transform coding. In one embodiment, there is no further explicit partitioning from the CU to the PU or from the CU to the TU to simplify the coding process. Therefore, the CU is also used as the PU and the TU. In other words, the leaf nodes of the binary tree are the basic units for the prediction process and transform process. In another embodiment, the leaf nodes of the binary tree are the basic units for the prediction process (i.e., the CU is also used as the PU), however it requires another partitioning from the CU to the TU. In yet another embodiment, the leaf nodes of the binary tree are the basic units for the transform process (i.e., the CU is also used as the TU), but it requires another partitioning from the CU to the PU.

The binary tree structure is more flexible than the quadtree structure since more partition shapes can be supported. Therefore, the binary tree structure has potential to achieve improved coding efficiency. However, the encoding complexity will also be increased due to the larger number of searches needed to identify the best partition shape. In order to balance the complexity and coding efficiency, another embodiment of the present invention combines the quadtree and binary tree structure, which is called as quadtree plus binary tree (QTBT) structure in this disclosure. According to the QTBT structure, a block is firstly partitioned by a quadtree process, where the quadtree splitting can be iterated until the size for a splitting block reaches the minimum allowed quadtree leaf node size or the quadtree partitioning process reaches a maximum allowed quadtree depth. If the leaf quadtree block is not larger than the maximum allowed binary tree root node size, it can be further partitioned by a binary tree partitioning process. The binary tree splitting can be iterated until the size (width or height) for a splitting block corresponding to a binary tree node reaches the minimum allowed binary tree leaf node size (width or height) or the binary tree depth reaches the maximum allowed binary tree depth.

In the QTBT structure, the minimum allowed quadtree leaf node size, the maximum allowed binary tree root node size, the minimum allowed binary tree leaf node width and height, and the maximum allowed binary tree depth can be indicated in the high level syntax such as SPS, PPS or slice header. However, the present invention is not limited thereto.

Figure 5A:
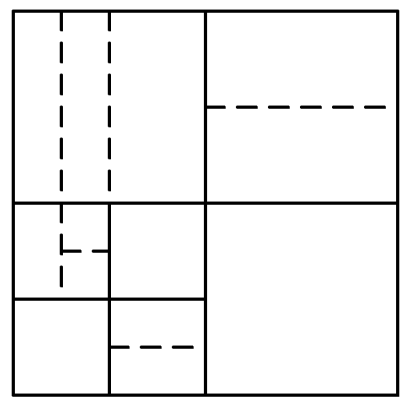
FIG. 5A illustrates an example of quadtree partitioning process plus binary tree partitioning process according to an embodiment of the present invention to partition a block of video data into final sub-blocks for the coding process comprising prediction process, transform process or both.
Figure 5B:
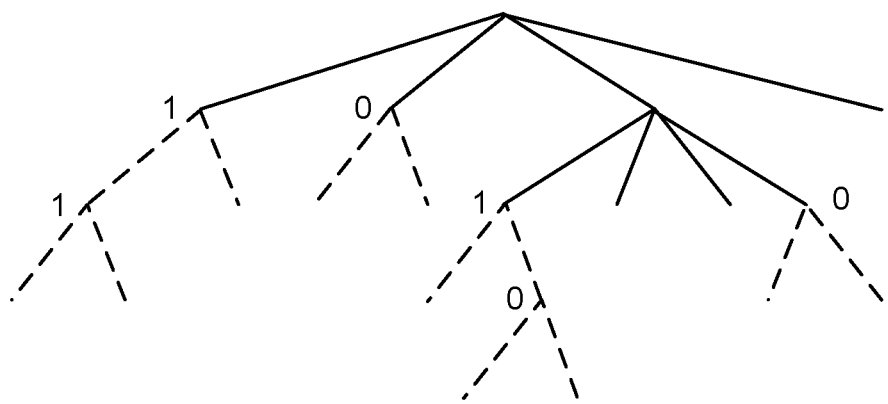
FIG. 5B illustrates an example of a partitioning tree corresponding to the partitioning structure of FIG. 5A, where the solid lines are associated with the quadtree partitioning process and the dashed lines are associated with the binary tree partitioning process.

FIG. 5A illustrates an example of block partitioning and FIG. 5B illustrates the corresponding QTBT. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since it always split a block horizontally and vertically into 4 sub-blocks with an equal size. It is noted that a binary tree partitioning process may result in a same partitioning result as the QTBT process, the two processes are different. The binary tree partitioning process allows more flexible partitioning to better match the local characteristics of underlying video data for coding process comprising prediction process, transform process or both.

The QTBT structure as disclosed above can be used for partitioning a block into multiple smaller blocks (i.e., final sub-blocks) such as partitioning a picture into CTUs, a slice into CTUs, a CTU into CUs, a CU into PUs, a CU into TUs, or a PU into TUs, and so on. For example, the QTBT partitioning process can be applied to partition a CTU into CUs, i.e., the root node of the QTBT is a CTU and the leaf nodes of the QTBT are CUs. The CUs are further processed by prediction and transform coding. In one embodiment, there is no further explicit partitioning from the CU to the PU or from the CU to the TU to simplify the coding process. In other words, the CU is also used as the PU and the TU. Therefore, the leaf nodes of the QTBT are the basic units for the prediction process and transform process. In another embodiment, the leaf nodes of the QTBT are the basic units for the prediction process (i.e., the CU is also used as the PU), however it requires another partitioning from the CU to the TU. In yet another embodiment, the leaf nodes of the QTBT are the basic units for the transform process (i.e., the CU is also used as the TU), but it requires another partitioning from the CU to the PU, in one example, there is only one partition type for partitioning a CU to PUs, so no PU partition information is needed to be signaled to the decoder.

In one example of the QTBT partitioning process, the CTU size is set to 128×128, the minimum allowed quadtree leaf node size is set to 16×16, the maximum allowed binary tree root node size is set to 64×64, the minimum allowed binary tree leaf node width and height both are set to 4, and the maximum allowed binary tree depth is set to 4. The quadtree partitioning process is applied to the CTU first to generate quadtree leaf nodes. The quadtree leaf nodes may have a size from 16×16 (i.e., the minimum allowed quadtree leaf node size) to 128×128 (i.e., the CTU size). If the leaf quadtree node is 128×128, it will not be further split by the binary tree since the size exceeds the maximum allowed binary tree root node size (i.e., 64×64). Otherwise, the leaf quadtree node will be further split by the binary tree. The quadtree leaf node is also the root node for the binary tree partitioning process having the binary tree depth as 0. When the binary tree depth reaches 4, which is the maximum allowed binary tree depth, it implies that no further splitting. When the binary tree node has width equal to 4, it implies no further vertical splitting. Similarly, when the binary tree node has height equal to 4, it implies no further horizontal splitting. The leaf nodes of the QTBT are further processed by prediction (e.g. intra-picture or inter-picture prediction) and transform coding.

In one embodiment of the present invention, the partitioning process combining the quadtree and binary tree structure firstly partitions a block by a binary tree partitioning process, where the binary tree partitioning process can be iterated until a termination criterion is met. If the size of the leaf binary tree block complies with a size constraint, it can be further partitioned by a quadtree partitioning process.

The quadtree partitioning process can be iterated until another termination criterion is met. The foregoing termination criteria can be associated with the splitting block size and/or the corresponding tree depth.

In another embodiment, a block of video data is partitioned into final sub-blocks by a multi-level block partitioning process. For example, a first level block partitioning process is a quadtree partitioning process, a second level block partitioning process is a binary tree partitioning process, and a third level block partitioning process is another quadtree partitioning process. Each level of the block partitioning process will be terminated while the splitting block size and/or the corresponding tree depth met a predetermined threshold. The second partitioning processes can be applied if the leaf block generated by the first level block partitioning processes is not larger than a first maximum allowed root node size, while the third partitioning processes can be applied if the leaf block generated by the second level block partitioning processes is not larger than a second maximum allowed root node size.

When the partitioning process disclosed above (e.g. binary tree or QTBT partitioning process) is applied to color video, separate partitioning process can be applied to luma and chroma components for an I-slice. The same partitioning process can be applied to both luma and chroma components for a P and B slice except when certain minimum sizes are reached for the chroma components. In other words, in an I-slice, the luma CTB may use its QTBT partitioning process, and the two chroma CTBs may have a separate QTBT partitioning process. In another example, the two chroma CTBs may also have separate QTBT partitioning process.

The coding performance for a system incorporating an embodiment of the present invention is compared to a conventional HEVC. As mentioned before, the conventional HEVC uses quadtree partitioning process to split a CTU into one or more CUs and a CU into one or more TUs recursively until a termination condition is reached. Also the conventional HEVC uses block partitioning process including to symmetric horizontal or vertical partition to split a CU into one or more PUs. The system incorporating an embodiment of the present system uses the QTBT partitioning process to split a CTU into one or more CUs. The CUs are used for prediction process and transform process without further explicit partitioning. The performance measurement is in terms of BD-rate, which is well known performance measurement in the field of video coding. Based on various text data, the system incorporating an embodiment of the present invention has demonstrated significant improvement over the convention HEVC. The improvement for the luma (i.e., Y component) chroma component (i.e., U and V components) under the All Intra and Random Access coding configuration is over 3% and 8% respectively in term of BD-Rate. However, the encoding running time also increases noticeably while the decoding time only increase slightly.

Figure 6:
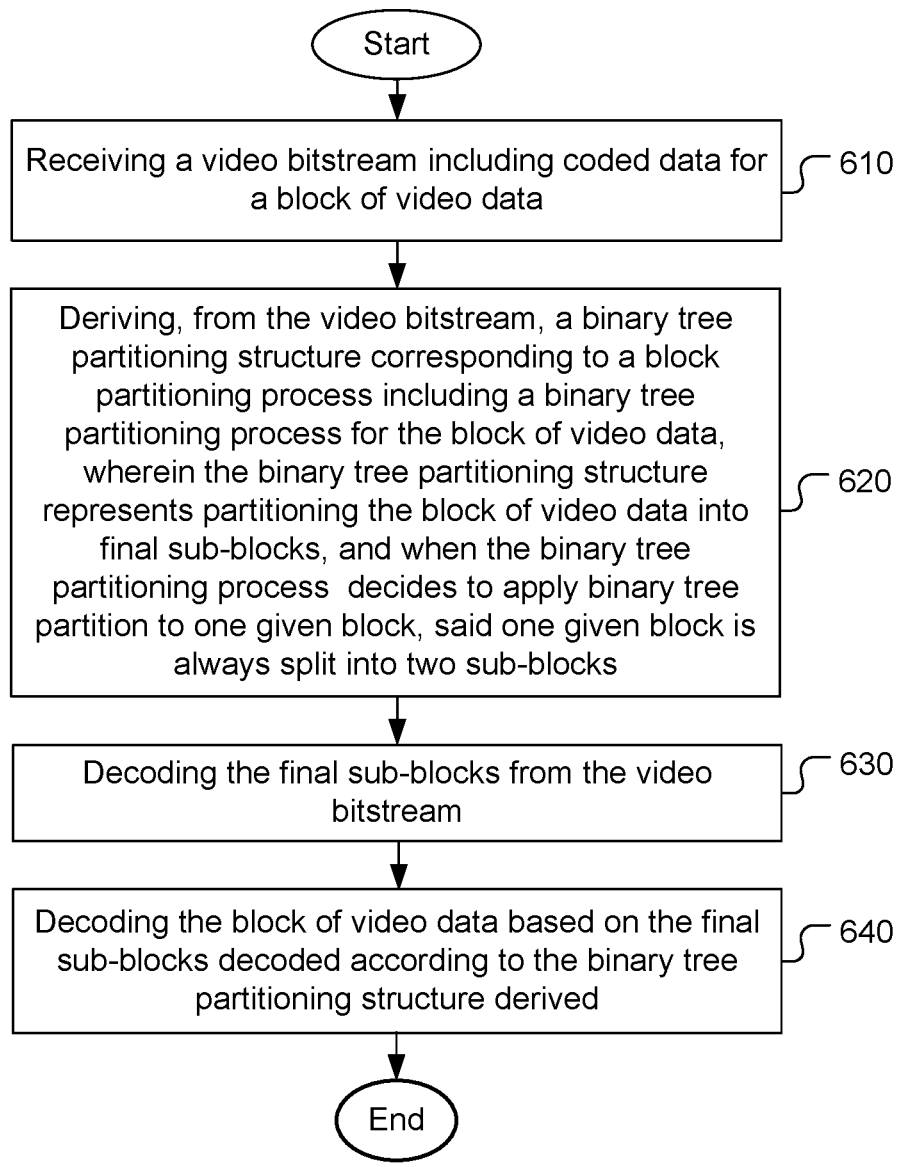
FIG. 6 illustrates an exemplary flowchart for a coding system using a block partitioning process based on a recursive binary tree partitioning process incorporating an embodiment of the present invention to partition a block of video data into final sub-blocks for the coding process comprising prediction process, transform process or both.

FIG. 6 illustrates an exemplary flowchart for a decoding system using block partitioning process incorporating an embodiment of the present invention. The system receives a video bitstream in step 610. The video bitstream may be retrieved from storage such as a computer memory of buffer (RAM or DRAM). The video bitstream may also be received from a processor such as a processing unit or a digital signal. A partitioning structure corresponding to a block partitioning process including a binary tree partitioning process is derived for the block of video data from the video bitstream in step 620. The partitioning structure represents partitioning the block of video data into final sub-blocks, and when the binary tree partitioning process decides to apply binary tree partition to one given block, said one given block is always split into two sub-blocks. The final sub-blocks are decoded based on the video bitstream in step 630. The block of video data is decoded based on the final sub-blocks decoded according to the partitioning structure derived as shown in step 640.

The flowchart shown above is intended to illustrate examples of video coding incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
receiving a video bitstream including coded data for a block of video data;
deriving, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:
parsing a first indicator associated with a current block; and
determining whether the binary tree partitioning process applies a binary tree partition to the current block based on a value of the first indicator, wherein when it is determined that the binary tree partition is applied to the current block, the current block is always split into two sub-blocks;
decoding the final sub-blocks based on the video bitstream; and
decoding the block of video data based on the final sub-blocks decoded according to the block partitioning structure derived;
wherein the first indicator is inferred as not applying binary tree partition when height and width of the current block both reach minimum allowed value, or tree depth reaches maximum allowed depth.

2. The method of claim 1, wherein binary tree partition types associated with the binary tree partition comprises symmetric horizontal partition and symmetric vertical partition.

3. The method of claim 1, wherein binary tree partition types associated with the binary tree partition comprises symmetric horizontal partition and symmetric vertical partition, asymmetric horizontal partition with narrower upper side, asymmetric horizontal partition with narrower lower side, asymmetric vertical partition with narrower left side and asymmetric vertical partition with narrower right side.

4. The method of claim 1, wherein a second indicator is used for the current block to indicate a binary tree partition type associated with the binary tree partition when the binary tree partition is applied to the current block.

5. The method of claim 4, wherein if the binary tree partition type consists of symmetric horizontal partition and symmetric vertical partition, the second indicator corresponds to a 1-bit flag to indicate the symmetric horizontal partition or the symmetric vertical partition.

6. The method of claim 5, wherein the second indicator is inferred as the symmetric vertical partition when height of the current block reaches minimum allowed height, and the second indicator is inferred to be the symmetric horizontal partition when width of the current block reaches minimum allowed width.

7. The method of claim 6, wherein the minimum allowed height and the minimum allowed width are specified in high level syntax including sequence parameter set (SPS), picture parameter set (PPS) or slice header.

8. The method of claim 1, wherein the block of video data corresponds to a coding tree unit (CTU) and the final sub-blocks associated with leaf nodes of the block partitioning structure correspond to coding units (CUs).

9. The method of claim 8, wherein all CUs are used for prediction process and/or transform process respectively without any further explicit partitioning process.

10. The method of claim 1, wherein the block of video data and the final sub-blocks correspond to picture and coding tree units (CTUs) respectively, slice and CTUs respectively, coding unit (CU) and prediction units (PUs) respectively, coding unit (CU) and transform units (TUs) respectively, or prediction unit (PU) and transform units (TUs) respectively.

11. The method of claim 1, wherein the block of video data for luma component and non-luma components in an I-slice uses individual block partitioning process or the block of video data for two chroma components in an I-slice uses individual block partitioning process.

12. The method of claim 1, wherein the block partitioning process further includes a quadtree partitioning process, wherein when the quadtree partitioning process decides to apply quadtree partition to one given block, said one given block is always split into four sub-blocks.

13. The method of claim 12, wherein the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes.

14. The method of claim 13, wherein the quadtree partitioning process for a selected node is implicitly terminated when the selected node reaches a minimum allowed quadtree leaf node size or quadtree depth associated with the selected node reaches a maximum allowed quadtree depth.

15. The method of claim 14, wherein the minimum allowed quadtree leaf node size, the maximum allowed quadtree depth are specified in high level syntax including sequence parameter set (SPS), picture parameter set (PPS) or slice header.

16. The method of claim 12, wherein the block of video data and the final sub-blocks correspond to coding tree unit (CTU) and coding units (CUs) respectively.

17. The method of claim 16, wherein all CUs are used for prediction process and/or transform process respectively without any further explicit partitioning process.

18. The method of claim 12, wherein the block of video data and the final sub-blocks correspond to picture and coding tree units (CTUs) respectively, slice and CTUs respectively, coding unit (CU) and prediction units (PUs) respectively, coding unit (CU) and transform units (TUs) respectively, or prediction unit (PU) and transform units (TUs) respectively.

19. A method of video encoding, the method comprising:
receiving input data associated with a block of video data;
determining a block partitioning structure corresponding to a block partitioning process including a binary tree partitioning process for the block of video data, wherein the block partitioning structure represents partitioning the block of video data into final sub-blocks, wherein said determining the block partitioning structure for the block comprises:
incorporating a first indicator associated with a current block into a video bitstream, wherein the first indicator indicates whether the binary tree partitioning process applies a binary tree partition to the current block, wherein when it is determined that the binary tree partition is applied to the current block, the current block is always split into two sub-blocks; and
applying an encoding process comprising prediction process, transform process or both to the block of video data by applying the encoding process at a level corresponding to the final sub-blocks;
wherein the first indicator is inferred as not applying binary tree partition when height and width of the current block both reach minimum allowed value, or tree depth reaches maximum allowed depth.

20. The method of claim 19, wherein binary tree partition types associated with the binary tree partition comprises at least two of symmetric horizontal partition and symmetric vertical partition, asymmetric horizontal partition with narrower upper side, asymmetric horizontal partition with narrower lower side, asymmetric vertical partition with narrower left side and asymmetric vertical partition with narrower right side.

21. The method of claim 19, wherein a second indicator is used for the current block to indicate a binary tree partition type associated with the binary tree partition when the binary tree partition is applied to the current block.

22. The method of claim 19, wherein the block of video data corresponds to a coding tree unit (CTU) and the final sub-blocks associated with leaf nodes of the block partitioning structure correspond to coding units (CUs).

23. The method of claim 22, wherein all CUs are used for prediction process and/or transform process respectively without any further explicit partitioning process.

24. The method of claim 19, wherein the block partitioning process further includes a quadtree partitioning process, wherein when the quadtree partitioning process decides to apply quadtree partition to one given block, said one given block is always split into four sub-blocks, wherein the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes.

25. The method of claim 24, wherein the block of video data and the final sub-blocks correspond to coding tree unit (CTU) and coding units (CUs) respectively, and all CUs are used for prediction process and/or transform process respectively without any further explicit partitioning process.

26. An apparatus for video decoding comprising one or more electronic devices configured to:
receive a video bitstream including coded data for a block of video data;
derive, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:
parsing a first indicator associated with a current block; and
determining whether the binary tree partitioning process applies a binary tree partition to the current block based on a value of the first indicator, wherein when it is determined that the binary tree partition is applied to the current block, the current block is always split into two sub-blocks;
decode the final sub-blocks based on the video bitstream; and
decode the block of video data based on the final sub-blocks decoded according to the block partitioning structure derived;
wherein the first indicator is inferred as not applying binary tree partition when height and width of the current block both reach minimum allowed value, or tree depth reaches maximum allowed depth.

27. An apparatus for video encoding comprising one or more electronic devices configured to:
receive input data associated with a block of video data;
determine a block partitioning structure corresponding to a block partitioning process including a binary tree partitioning process for the block of video data, wherein the block partitioning structure represents partitioning the block of video data into final sub-blocks, wherein said determining the block partitioning structure for the block comprises:

incorporating a first indicator associated with a current block into a video bitstream, wherein the first indicator indicates whether the binary tree partitioning process applies a binary tree partition to the current block, wherein when it is determined that the binary tree partition is applied to the current block, the current block is always split into two sub-blocks; and apply an encoding process comprising prediction process, transform process or both to the block of video data by applying the encoding process at a level corresponding to the final sub-blocks;

wherein the first indicator is inferred as not applying binary tree partition when height and width of the current block both reach minimum allowed value, or tree depth reaches maximum allowed depth.

28. A non-transitory computer readable medium storing a computer-executable program, the computer-executable program, when executed, causing a decoder to perform the following steps:

receiving a video bitstream including coded data for a block of video data;

deriving, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:

parsing a first indicator associated with a current block; and determining whether the binary tree partitioning process applies a binary tree partition to the current block based on a value of the first indicator, wherein when it is determined that the binary tree partition is applied to the current block, the current block is always split into two sub-blocks;

decoding the final sub-blocks based on the video bitstream; and decoding the block of video data based on the final sub-blocks decoded according to the block partitioning structure derived;

wherein the first indicator is inferred as not applying binary tree partition when height and width of the current block both reach minimum allowed value, or tree depth reaches maximum allowed depth.

* * * * *